United States Patent [19]
Roos et al.

[11] Patent Number: 5,577,074
[45] Date of Patent: Nov. 19, 1996

[54] COMBINED CLOCK RECOVERY/FREQUENCY STABILIZATION LOOP

[75] Inventors: David A. Roos, Boyds; Robert W. Davis, III, Woodbine, both of Md.

[73] Assignee: Hughes Electronics, Los Angeles, Calif.

[21] Appl. No.: 546,028

[22] Filed: Oct. 20, 1995

[51] Int. Cl.$^6$ .................................................. H03D 3/18
[52] U.S. Cl. .......................... 375/327; 375/211; 455/75; 455/76; 455/119; 332/107; 332/123; 332/126
[58] Field of Search ....................................... 375/327, 211, 375/362, 375; 455/75–76, 119, 182.1–182.2, 259–260, 265; 370/95.1, 100.1, 105.1; 332/126, 107, 123, 159, 160

[56] References Cited

U.S. PATENT DOCUMENTS 3,611,435 10/1971 Cooper ...................................... 375/211
4,606,049 8/1986 Daniel ...................................... 375/211
5,404,378 4/1995 Kimura ...................................... 332/123

*Primary Examiner*—Stephen Chin
*Assistant Examiner*—Thuy L. Nguyen
*Attorney, Agent, or Firm*—John T. Whelan; Wanda K. Denson-Low

[57] ABSTRACT

The effects of long-term drift in a local reference oscillator are compensated by dividing the local reference oscillator frequency by one of three divider patterns (nominal ratio, add a cycle, delete a cycle) so that the symbol clock of the remote terminal is equal to the outroute symbol rate. The number of add a cycle and delete a cycle divider patterns are counted and stored. The average of the number of add a cycle and delete a cycle patterns is used to control the transmit frequency of the remote terminal to correspond to the outroute symbol rate. Thus, the clock recovery process generates a frequency calibration number used to track the frequency of the remote terminal local reference oscillator and to adjust the transmit frequency of the remote terminal accordingly.

21 Claims, 3 Drawing Sheets

COMBINED CLOCK RECOVERY/FREQUENCY STABILIZATION LOOP

BACKGROUND OF THE INVENTION

Satellite communication systems typically have employed large aperture antennas and high power transmitters for establishing an uplink to the satellite. Recently, however, very small aperture antenna ground terminals ("VSAT"), referred to as remote ground terminals, have been developed for data transmission at low rates. In such systems, the remote ground terminals are utilized for communicating via a satellite from a remote location to a central hub station. The central hub station communicates with multiple remote ground terminals, and has a significantly larger antenna, as well as a significantly larger power output capability than any of the remote ground terminals.

In a low-rate VSAT system, it is very important that good transmit frequency accuracy be maintained. A reference frequency of sufficient accuracy is prohibitively expensive, so ways are found of deriving a reference from the outroute bit timing. The outroute bit timing can be made very accurate at the hub, thus incurring the cost of a very accurate reference frequency only once per network, thereby amortizing its cost over many remote VSATs.

VSAT remote terminals obtain their reference frequencies from the bit timing of the outroute signal from the hub to the remote terminal. The local oscillator is usually compared with the outroute symbol rate to determine what frequency adjustment is necessary at the remote terminal. However, the local reference oscillator frequency has a tendency to drift and thus it is difficult to accurately adjust the ever-changing reference frequency to match the outroute symbol rate.

Conventional methods of maintaining frequency accuracy relied on analog bit timing recovery loops, multiple oscillators, and direct frequency counting of the local reference oscillator to obtain an accurate transmit frequency. These methods derive the reference frequency from the outroute bit rate over long time periods; thus, the local reference oscillator must remain stable throughout a long measurement period or the measurement will be invalid. Because of the amount of time required to accumulate enough counts to get an accurate measurement of reference frequency, the reference has to be ovenized so it would not drift significantly during the frequency measurement process. This type of conventional approach requires a costly high stability oscillator. An example of one type of conventional system is disclosed in U.S. Pat. No. 4,489,413 issued to Richmond et al.

None of the conventional frequency stabilization techniques provides the important advantages of quick and accurate measurement of reference frequency without using a costly reference oscillator thus reducing the short-term stability requirements of the local reference to that of a much less expensive temperature-compensated oscillator with thermal isolation.

SUMMARY OF THE INVENTION

According to the invention, the frequency of a local reference oscillator is compared to the outroute symbol rate. The clock recovery process generates a frequency calibration number which is used to track the frequency of local reference oscillator relative to the symbol rate. The remote terminal periodically uses the frequency calibration number to adjust the local oscillator frequency so that it remains the same as the outroute symbol rate.

The frequency calibration number is derived by frequency multiplying the reference oscillator frequency to get a larger frequency for phase error accuracy. This multiplied frequency value is then divided by one of three divider patterns (nominal ratio, add a cycle, delete a cycle) so that the symbol clock of the remote terminal is equal to the outroute symbol rate. The number of add a cycle and delete a cycle divider patterns needed to maintain an accurate frequency is counted and stored.

An average of the add a cycle and delete a cycle patterns, i.e., frequency calibration number, during a specified time interval is proportional to the frequency offset of the local reference oscillator compared to the outroute symbol rate. This average is used to control the transmit frequency of the remote terminal to correspond to the outroute symbol rate and to compensate for long term drift in the local reference oscillator. Thus, the clock recovery process generates a frequency calibration number used to track the frequency of the remote terminal's local reference oscillator. This frequency number is read at periodic time intervals and is used to adjust the transmit frequency of the remote terminal accordingly.

This invention is completely digital and provides for quick and accurate measurement of reference frequency using a simpler and cheaper low stability oscillator than is used in the conventional systems.

The invention itself, together with further objects and attendant advantages, will best be understood by reference to the following detailed description, taken in conjunction with the accompanying drawings.

DETAILED DESCRIPTION OF THE DRAWINGS

Figure 1:
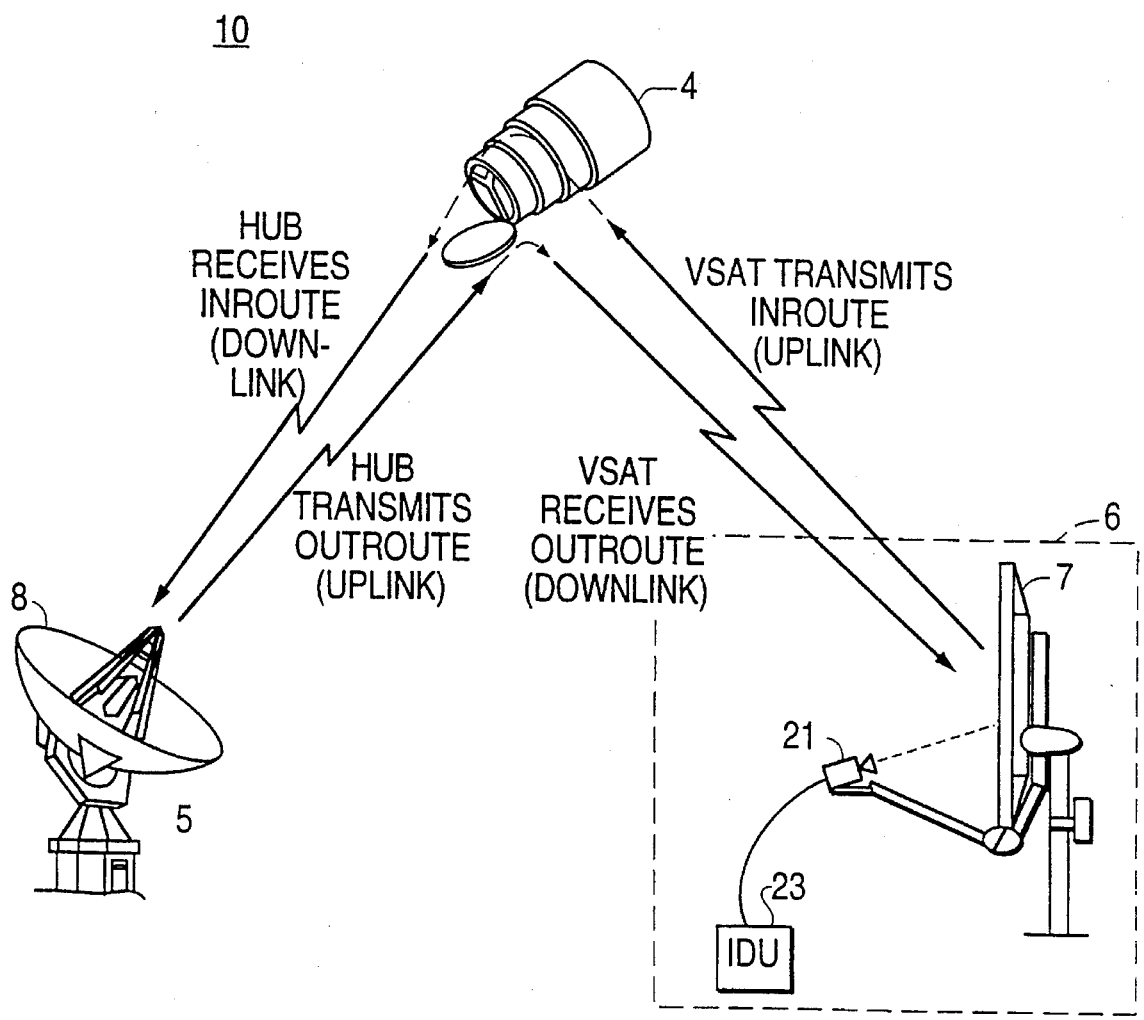
FIG. 1 is a block diagram of a VSAT satellite communication network which utilizes the invention.

Turning now to the drawings, the VSAT satellite communication network 10 illustrated in FIG. 1, comprises a central hub station 5, a communication satellite 4, and a plurality of remote ground terminals 6 (only one is shown). The VSAT network 10 functions as a two-way transmission system for transferring data and voice communications between the central hub station 5 and the numerous remote ground terminals 6. All data is transferred between the central hub station 5 and the remote ground terminals 6 via transponders located in the satellite 4. Signals transmitted from the central hub station 5 to the remote ground terminal 6 are referred to as "outroute", while signals transmitted in the opposite direction are referred to as "inroute".

As stated, the central hub station 5 supports a plurality of remote ground terminals 6. The central hub station 5 comprises a large antenna 8 to allow for the transmission of a signal sufficiently strong such that the signal can be received by the remote ground terminals 6 which have relatively small antennas. The large antenna 8 of the central hub station 5 also compensates for the relatively weak signals transmitted by the remote ground terminals 6.

The remote ground terminal 6 comprises a small aperture antenna 7 for receiving and transmitting the downlink and uplink signals, respectively; an outdoor unit 21 typically mounted proximate the antenna 7 which comprises a transmitter for producing and transmitting a modulated uplink signal; and an indoor unit 23 which operates as an interface between the user's communication equipment (e.g., data terminals, personal computers, monitoring equipment and telephone equipment) and the outdoor unit 21.

More specifically, the indoor unit 23 is coupled to the user's equipment (not shown in FIG. 1). The indoor unit 23 is also coupled to the outdoor unit 21. The indoor unit 23 receives data from the user's equipment and transfers it to the ODU 21 via a modulated signal. The ODU 21 transmits this signal (i.e. uplinks) to the satellite 4. The satellite 4 is linked to the central hub 5 via wireless communication link so that the signal from the indoor unit 23 is transferred to the central hub station 5. Upon receipt by the central hub station 5, the modulated carrier signal is demodulated such that the data transmitted from the remote user is reproduced and processed by the central hub station 5.

Figure 2:
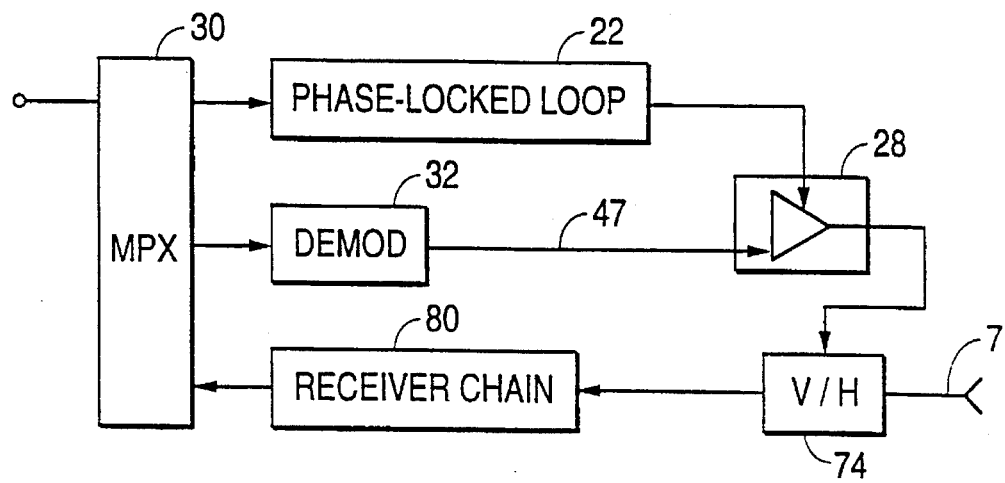
FIG. 2 is a block diagram of the outdoor unit of this invention.

FIG. 2 illustrates one embodiment of a transmitter 34 according to the present invention. Specifically, the transmitter 34 is shown as part of the outdoor unit 21 of the VSAT network 10 shown in FIG. 1. As shown in FIG. 2, the transmitter 34 comprises a phase-locked loop circuit 22 for generating a signal modulated with the desired transmit data from the IDU 23, followed by a power amplifier 28 for amplifying the modulated carrier signal.

As shown in FIG. 2, the outdoor unit 21 comprises a multiplexor 30 which has as its input the data output from the indoor unit 23. The multiplexor 30 produces two outputs, one of which is input to the phase-locked loop 22 and the other of which is input to a demodulator 32 which detects the presence or absence of a signal used to turn on or off the power amplifier 28. The power amplifier 28 has as its inputs the output of the phase-locked loop 22 and the demodulator 32. The power amplifier 28 output is coupled to an ortho-mode transducer 74, which is in turn coupled to the antenna 7.

The ortho-mode transducer 74 is also coupled to a receiver chain 80, so that when the outdoor unit 21 receives signals from the central hub station 5, those signals can be transferred to the indoor unit 23. The output of the receiver chain 80 is input to the multiplexor 30 which is in turn input to the indoor unit 23.

The operation of the transmitter 34 of this invention is explained in conjunction with the operation of the outdoor unit 21 of the VSAT network 10 of FIG. 1. The outdoor unit 21 comprises the multiplexor 30 which receives a signal from the indoor unit 23. This signal provides a 111 MHz reference signal, DC power and an approximately 30 MHz modulated control signal to the outdoor unit 21. As shown in FIG. 2, the multiplexor 30 couples the 111 MHz reference signal to the input of the phase-locked loop circuit 22 of the transmitter 34, and couples the approximately 30 MHz control signal to the demodulator 32 of the transmitter 34.

The presence of the approximately 30 MHz control signal turns on the power amplifier 28 (via the demodulator 32) to allow transmission of the modulated carrier signal generated by the IDU 23. The demodulator 32 receives and demodulates (detects) the approximately 30 MHz signal to produce the carrier control signal 47 which is utilized to activate the poser amplifier 28 of the transmitter.

The phase-locked loop circuit 22 functions to produce a modulated signal of proper deviation for presentation the power amplifier 28. The output of the phase-locked loop 22 is responsive to the frequency and modulation present on the approximately 110 MHz signal entering the multiplexer 30. The power amplifier 28 comprises a saturated, nonlinear amplifier.

Referring again to FIG. 2, the outdoor unit 21 of the VSAT network 10 also comprises the receiver chain 80 for receiving the downlink signal from the satellite. The receiver chain 80 comprises a low noise amplifier and a downconverter which transforms the received signal into a corresponding intermediate frequency signal. This signal is then coupled to the indoor unit 23, where it is further demodulated so as to create the data transmitted from the central hub station 5, which is then processed accordingly.

Figure 3:
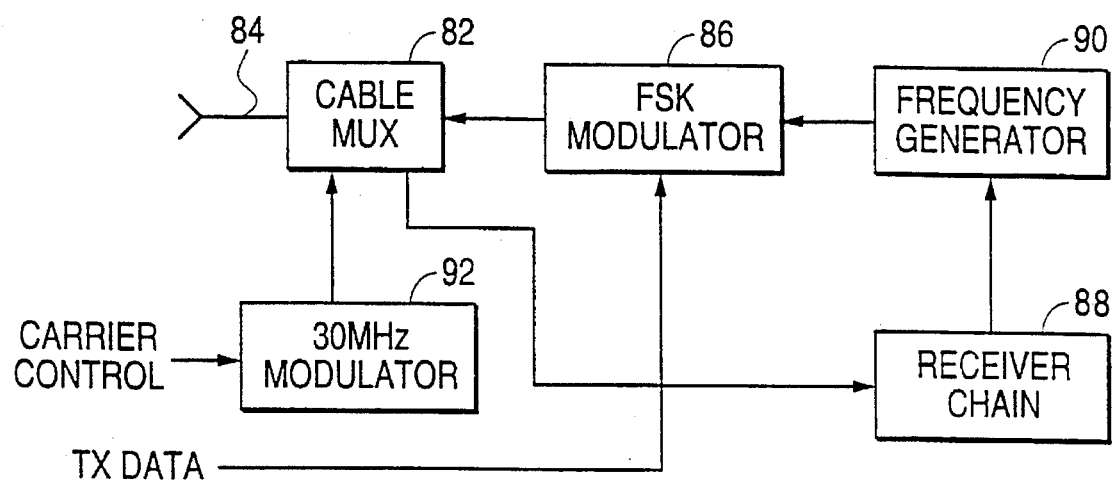
FIG. 3 is a block diagram of the indoor unit of this invention.

FIG. 3 illustrates one embodiment of the indoor unit 23 of the VSAT network 10 of FIG. 1. As shown in FIG. 3, data responsive to the user's equipment (not shown) are applied to an FSK modulator 86 which is coupled to the output of the frequency generator 90 and modulates the output of the frequency generator 90 to produce an approximately 110 MHz modulated carrier. A control signal ("carrier control") is applied to a 30 MHz modulator 92. When the IDU 23 has data to send (usually the user's equipment), it causes the 30 MHz signal to be on; when there is no data to send, the 30 MHz signal is off. The multiplexor circuit 82 has as its inputs the output of the FSK modulator 86 and the 30 MHz modulator 92. The multiplexor 82 combines the modulated 110 MHz carrier and the 30 MHz signal into the input/output port 84 which is in turn coupled to the multiplexor 30 of the outdoor unit 21 via a cable.

The output of the multiplexor 82 is input to a receiver chain 88 for further demodulating and recreating the data contained in the downlink signal. The method of receiving data is conventional and well known to those skilled in the art. The receiver chain 88 is coupled to frequency generator 90 for generating the 111 MHz reference signal which is coupled to the input of the phase-locked loop circuit 22 of the outdoor unit 21 via the multiplexer 30. The frequency of the 111 MHz reference signal can be varied so as to provide predefined steps to accommodate the frequency division multiple access techniques utilized by the VSAT network.

Figure 4:
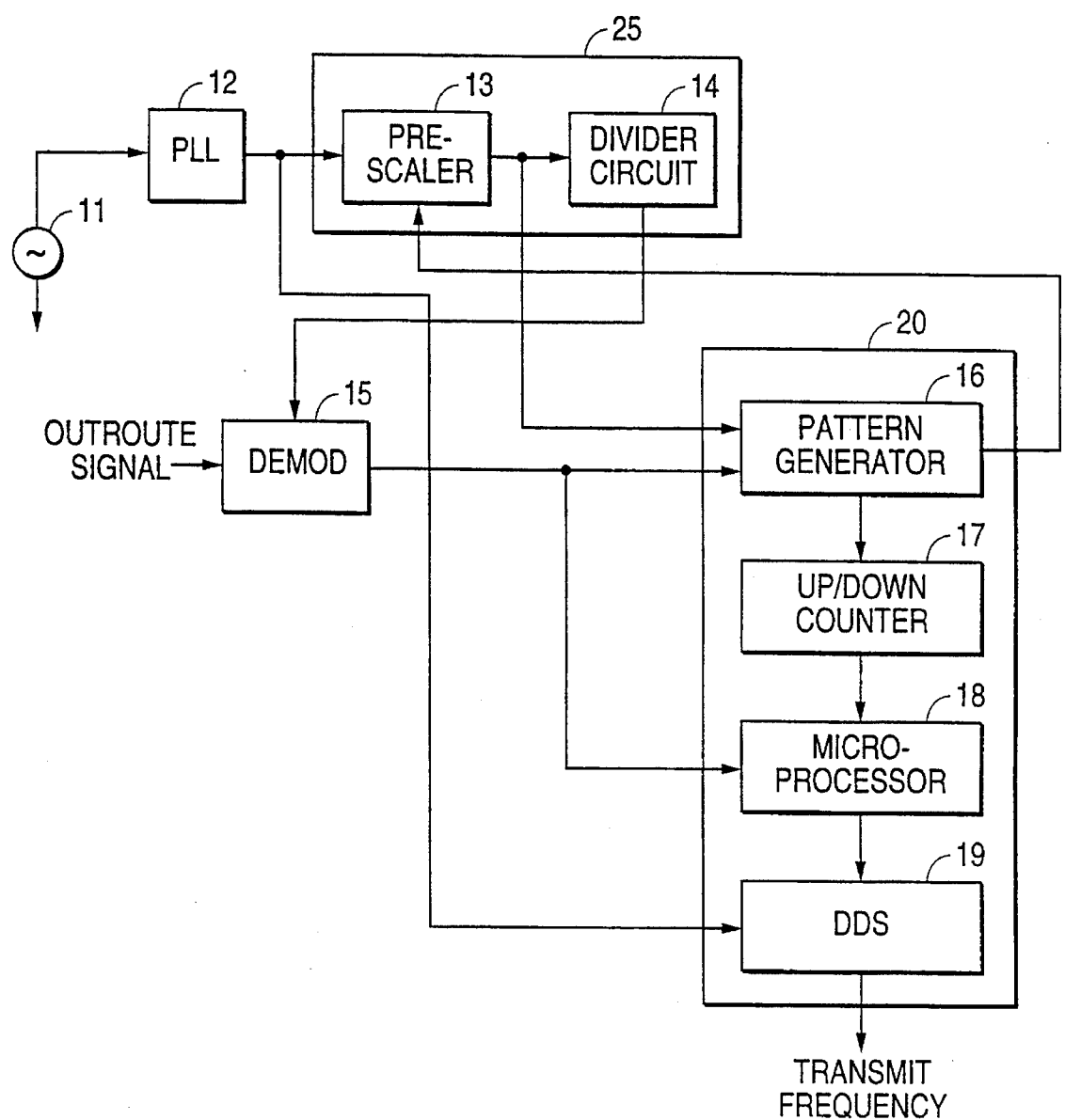
FIG. 4 is a block diagram of the combined clock recovery/frequency stabilization loop of this invention.

In order to maintain a good transmit frequency accuracy in the remote ground terminal 6, the remote terminals of this invention obtain their reference frequency from the bit timing of the outroute from the hub 5. Each remote terminal 6 contains a frequency stabilization loop in the IDU as shown in FIG. 4 in accordance with this invention. As shown in FIG. 4, a local reference oscillator 11 generates a reference frequency of 10.24 MHz. The local reference oscillator 11 is coupled to a phase locked loop (PLL) 12 which acts as a frequency multiplier. The output of PLL 12 is input to a frequency divider 25 and a frequency error compensator 20. The frequency divider 25 comprises a dual modulus prescaler 13 and a divider circuit 14. The frequency error compensator 20 includes, a pattern generator 16, an up/down counter 17, a microprocessor 18, and a direct digital synthesizer (DDS) 19. The output of the PLL 12 is received by the DDS portion 19 of the frequency error compensator 20 as well as the prescaler 13. The prescaler 13 produces a nominal frequency signal which is input both to the divider circuit 14 and the pattern generator 16 of the frequency error compensator 20. The output of the divider circuit 14 is the symbol clock of the remote terminal. This symbol clock is input to a digital demodulator 15, which has as its other input an externally applied outroute signal that is to be received.

The output of the digital demodulator 15 is a bit timing recovery signal which is input to the pattern generator 16 and the microprocessor 18. Having the bit timing recovery signal and the nominal frequency signal from the prescaler 13 as its inputs, the pattern generator 16 produces a divider pattern which is input to the prescaler 13 and pattern signal which is input to an up/down counter 17. The output of the up/down counter 17 is coupled to a microprocessor 18 which periodically reads the up/down counter 17. The microprocessor 18 outputs a frequency calibration number which is input to the DDS 19. The DDS 19 produces the transmit frequency of the remote terminal based on the frequency calibration number from the microprocessor 18 and the PLL 12 output.

In operation, the demodulator 15 receives externally applied outroute signals from the hub 5 and performs bit timing recovery (BTR) in the frequency stabilization loop of this invention to align the receive clock with the incoming bits. A by-product of this bit timing recovery process is the frequency error of the local reference oscillator 11, which is then used to correct the transmit frequency by fine tuning using the DDS 19.

In the frequency stabilization loop, the local temperature compensated reference oscillator 11 operates at a set reference frequency. The reference oscillator 11 is set to correspond to the outroute symbol rate and in the preferred embodiment is 10.24 MHz. The 10.24 MHz reference oscillator frequency is multiplied in the PLL 12 to a higher proportional frequency. The reference oscillation frequency is multiplied to get a higher proportional frequency because the bit resolution is higher at higher frequencies, thus the number of cycles used to determine the frequency calibration number (to be described later) can be more accurately determined at higher frequencies. In the preferred embodiment the resulting proportional frequency is 860.16 MHz out of the PLL 12.

Due to long-term drift in the reference oscillator 11, the frequency of the reference oscillator 11 may not be exactly at the value set to match the outroute symbol rate. For example, the frequency may be off by 1 part per million. In order to compensate for this variation, the higher proportional frequency signal from the PLL 12 is divided by the prescaler 13. In the preferred embodiment, the prescaler 13 is a divide-by-32/33 prescaler which produces a nominal frequency of 26.624 MHz. The ratio of time dividing by 32 to the time dividing by 33 produces an intermediate frequency from the prescaler 13 of exactly 26.624 MHz. The divide-by-32/33 prescaler 13 is selected because of its commercial availability. The 26.624 MHz frequency value represents the frequency needed such that when the signal is divided in the divider 14, the symbol clock of the remote terminal is equal to the outroute signal symbol rate.

For example, in the preferred embodiment the 26.624 MHz signal is further divided by 26 in the divider 14 (in the preferred embodiment a custom integrated divide by 26/104 circuit) to match the outroute symbol clock rate of 1.024 MHz. In general, the divider 14 either divides the signal by 26 (for 1.024 Msps rate) or 104 (for 256 Ksps rate), depending on the outroute symbol rate that is programmed in the divider 14. The prescaler 13 and the divider 14 work in conjunction to divide the 860.16 MHz frequency from the PLL 12 to a value representing the symbol clock.

The symbol clock from the divider 14 drives the digital demodulator 15. The digital demodulator 15 compares the symbol clock of the remote terminal 6 to the bit timing in the outroute signal and produces a bit timing recovery control signal for phase error correction which in turn controls the pattern generator 16. Bit timing recovery is performed by adding or subtracting 860.16 MHz cycles to/from the 26.624 MHz nominal clock and can be performed using conventional techniques known to those skilled in the art. The bit timing recovery signal is a pulse-width modulated (PWM) signal whose on/off ratio is proportional to the frequency change needed to maintain bit timing lock.

The bit timing recovery signal from the digital demodulator 15 is input to the pattern generator 16. The pattern generator 16 also has as an input the intermediate frequency signal (i.e., 26.624 MHz) from the prescaler 13. In the pattern generator 16, the bit timing recovery signal is compared to the intermediate frequency signal from the prescaler 13 in order to determine the number of cycles that have been added and/or subtracted to compensate for drift in the reference oscillator. Also, the results of this comparison are used to determine which of the three divider patterns must be produced to maintain a specified frequency (e.g. 26.624 MHz) out of the prescaler 13. The pattern generator 16 generates one of three different divider patterns, each of which represents a different collection of divide-by sequences to control the prescaler 13 to maintain the specified intermediate frequency. The value of the divider patterns are functions of the bit rate and reference frequency.

One divide-by sequence is the nominal divide ratio, which for an input frequency of 860.16 MHz and an output frequency of 26.624 MHz is nine highs and four lows, i.e. the prescaler 13 divides by 33 for nine cycles and by 32 for four cycles. The nominal divide ratio is used when there is no phase error between the outroute signal and the local reference oscillator 11.

Another sequence, used to delete a cycle of 860.16 MHz, is ten high and three low; the third sequence, used to add a cycle, is eight high and five low. Cycles are added or deleted to compensate for phase error between the outroute signal and the local reference oscillator 11. Each cycle represents time in 860.16 MHz quanta (1.1626 nsec). Based on the magnitude of the bit timing recovery signal, either the delete a cycle or add a cycle pattern is substituted for the nominal divide ratio to maintain a specified intermediate frequency (e.g., 26.624 MHz) from prescaler 13. The pattern generator 16 also provides a pattern signal to an up/down counter 17 to count the number of cycles that are added and/or deleted during each PWM frame.

The microprocessor 18 periodically reads the up/down counter 17 to determine, over so many PWM frames, how may cycles were added and/or deleted. In the preferred embodiment, the microprocessor 18 makes a reading every second, but the interval of the readings may be any value so long as the period is long enough to get an accurate reading, yet short enough so there will be no changes in the reference oscillator frequency. The number from the up/down counter 17 is exactly proportional to the frequency offset of the local reference oscillator 11 compared to the outroute bit rate, but corrupted by noise within the bit timing recover loop bandwidth. The microprocessor 18 maintains a running average of the readings from the up/down counter 17 over several seconds to reduce the effect of short term variations in the local reference oscillator 11. The average from the microprocessor 18 is a frequency calibration number or nominal transmit frequency number.

The microprocessor 18, programs the DDS 19 with the frequency calibration number corrected by the bit timing recovery control from the digital demodulator 15. The DDS 19 uses the 860.16 MHz clock from the PLL 12 to determine how much the transmit frequency must be changed, based on the frequency calibration number, to compensate for the error in the reference oscillator 11 frequency. The operation of the DDS is done using conventional techniques known to those skilled in the art. In the preferred embodiment the 860.16 MHz clock is divided by 32 in a divider (not shown) prior to being input to the DDS 19 because the DDS 19 cannot operate directly at 860.16 MHz.

The DDS 19 generates the transmit frequency for the remote terminal which is the frequency multiplied local reference frequency signal from the PLL 12 adjusted in accordance with the frequency calibration number. The transmit frequency is proportional to the frequency of the local reference oscillator 11 and can tune with a high degree of precision to any frequency commanded by the microprocessor 18. As a result, if the local reference oscillator 11 is stable enough over the short term, its long term drift will be exactly compensated by the frequency stabilization loop of this invention.

Variations on the above embodiments are possible. For example, the divider and multiplier values selected may be changed to any values that would achieve the same phase synchronization between the local reference oscillator and the outroute signal.

Of course, it should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of the invention.

What is claimed is:

1. A frequency stabilization loop for a communication device, comprising:
   a local reference oscillator which generates a local reference frequency signal;
   a frequency divider which divides said local reference frequency signal to produce an intermediate frequency signal and a local symbol clock;
   a demodulator which compares a symbol rate of an externally applied signal which said local symbol clock, said demodulator performing bit timing recovery to measure said local symbol clock against said symbol rate and producing a bit timing recovery control signal indicative of said measurement; and
   a frequency error compensator which receives said bit timing control signal, intermediate frequency signal, and said local reference frequency signal and adjusts said local reference frequency signal based on said timing control and intermediate frequency signals to the proper transmission frequency.

2. The frequency stabilization loop of claim 1, wherein said frequency error compensator comprises:
   a pattern generator having as its input said bit timing recovery control signal from said demodulator and said intermediate frequency from said divider, said pattern generator comparing said bit timing recovery control signal and said intermediate frequency and based on said comparison generating one of a plurality of divider patterns used to divide said local reference frequency signal and producing a pattern signal indicative of the type of divider pattern being generated, and said frequency divider dividing said local reference frequency signal by a set of values indicated by said divider pattern.

3. The frequency stabilization loop of claim 2, wherein said frequency error compensator further comprises:
   an up/down counter, having as its input said pattern signal from said pattern generator, for counting the occurrence of specified divider patterns during a set time interval and for producing a count signal indicative of the number of specified divider patterns; and
   a synthesizer having as it input said count signal, said synthesizer producing said transmit frequency signal adjusted according to said count signal.

4. The frequency stabilization loop of claim 1, further comprising:
   a phase locked loop for multiplying said local reference frequency signal prior to said local reference frequency signal being divided by said one of said plurality of divider patterns.

5. The frequency stabilization loop of claim 3, further comprising:
   a microprocessor for producing an average of said number of specified divider patterns from said up/down counter, said microprocessor providing an average count signal to said synthesizer.

6. The frequency stabilization loop of claim 1 further comprising a second divider for dividing said local reference frequency signal prior to said local reference frequency signal being input to said frequency error compensator.

7. The frequency stabilization loop of claim 1 wherein said frequency divider comprises a prescaler and a divider circuit.

8. The frequency stabilization loop of claim 2, wherein said divider patterns control said frequency divider to divide said reference frequency signal by a specified value for a specified number of clock cycles and by another specified value for a specified number of clock cycles.

9. The frequency stabilization loop of claim 2, wherein said divider patterns include:
   a nominal ratio pattern which controls said frequency divider to divide said reference frequency signal by a first value for a first number of clock cycles and by a second value for a second number of clock cycles;
   an add a cycle pattern which controls said frequency divider to divide said reference frequency signal by said first value for a third number of clock cycles and by said second value for a fourth number of clock cycles; and
   a delete a cycle pattern which controls said frequency divider to divide said reference frequency signal by said first value for a fifth number of clock cycles and by said second value for a sixth number of clock cycles.

10. The frequency stabilization loop of claim 9, wherein said first through sixth number of clock cycles in determined according to an outroute bit rate and said reference frequency signal.

11. The frequency stabilization loop of claim 9, wherein said nominal ratio pattern consist of nine high clock cycles and four low clock cycles.

12. The frequency stabilization loop of claim 9, wherein said delete a cycle pattern consist of ten high clock cycles and four low clock cycles.

13. The frequency stabilization loop of claim 9, wherein said add a cycle pattern consist of eight high clock cycles and five low clock cycles.

14. A method of frequency stabilization, comprising the steps of:
   generating a local reference frequency signal;
   comparing the local reference frequency signal to an outroute signal frequency;
   dividing said local reference frequency signal by one of a plurality of divider patterns which are selected base on said comparison of the local reference frequency signal to the outroute signal;

counting the occurrence of specified divider patterns during a time interval;

maintaining an average of the occurrence of specified divider patterns within a specified time interval; and generating a transmit frequency based on said average.

15. The method of claim 14, further comprising the step of frequency multiplying said local reference frequency signal prior to comparing said local reference frequency signal to said outroute signal.

16. The method of claim 14, wherein said reference frequency signal is divided by a specified value for a specified number of clock cycles and by another specified value for another specified number of clock cycles according to said divider patterns.

17. The method of claim 14, wherein said divider patterns include:

a nominal ratio pattern which divides said local reference frequency signal by a first value for a first number of clock cycles and by a second value for a second number of clock cycles;

an add a cycle pattern which divides said local reference frequency signal by said first value for a third number of clock cycles and by said second value for a fourth number of clock cycles; and a delete a cycle pattern which divides said local reference frequency signal by said first value for a fifth number of clock cycles and by said second value for a sixth number of clock cycles.

18. The frequency stabilization loop of claim 17, wherein said first through sixth number of clock cycles is determined according to an outroute bit rate and said reference frequency signal.

19. The method of claim 17 wherein said nominal ratio pattern consist of nine high cycles and four low cycles.

20. The method of claim 17 wherein said delete a cycle pattern consist of ten high cycles and four low cycles.

21. The method of claim 17 wherein said add a cycle pattern consist of eight high cycles and five low cycles.

* * * * *